US012804555B2

(12) United States Patent
Yin et al.

(10) Patent No.: US 12,804,555 B2
(45) Date of Patent: Nov. 17, 2026

(54) POWER CONTROL METHOD AND APPARATUS, NETWORK NODE, TERMINAL AND STORAGE MEDIUM

(71) Applicant: ZTE CORPORATION, Shenzhen (CN)

(72) Inventors: Yachao Yin, Shenzhen (CN); Nan Zhang, Shenzhen (CN); Wei Cao, Shenzhen (CN); Chenchen Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 334 days.

(21) Appl. No.: 18/574,912

(22) PCT Filed: Jul. 12, 2022

(86) PCT No.: PCT/CN2022/105046
§ 371 (c)(1),
(2) Date: Dec. 28, 2023

(87) PCT Pub. No.: WO2023/284704
PCT Pub. Date: Jan. 19, 2023

(65) Prior Publication Data
US 2024/0306097 A1 Sep. 12, 2024

(30) Foreign Application Priority Data
Jul. 12, 2021 (CN) ......................... 202110784568.7

(51) Int. Cl.
*H04W 52/32* (2009.01)
*H04W 52/36* (2009.01)
*H04W 74/0833* (2024.01)

(52) U.S. Cl.
CPC ....... *H04W 52/325* (2013.01); *H04W 52/367* (2013.01); *H04W 74/0833* (2013.01)

(58) Field of Classification Search
CPC ............. H04W 52/325; H04W 52/367; H04W 74/0833; H04W 52/242; H04W 52/42;
(Continued)

(56) References Cited

U.S. PATENT DOCUMENTS 12,063,097 B2 * 8/2024 Liu ..................... H04W 52/247
12,513,605 B2 * 12/2025 Sha ....................... H04W 48/04
(Continued)

FOREIGN PATENT DOCUMENTS

CN 109475001 A 3/2019
CN 110089162 A 8/2019
(Continued)

OTHER PUBLICATIONS

International Search Report in Application No. PCT/CN2022/105046, dated Oct. 10, 2022, 6 pages, including translation.
(Continued)

*Primary Examiner* — Ayaz R Sheikh
*Assistant Examiner* — Tarell A Hampton
(74) *Attorney, Agent, or Firm* — Morgan, Lewis & Bockius LLP

(57) ABSTRACT

Provided are a power control method and apparatus, a network node, a terminal and a storage medium. According to the method, configuration signaling is sent, where the configuration signaling is used for indicating L power control parameter sets associated with N synchronization signal block (SSB) sets, where N is a positive integer and L is a positive integer; and a random access preamble is received, where transmission power of the random access preamble is determined by a terminal according to the configuration signaling.

14 Claims, 4 Drawing Sheets

(58) Field of Classification Search
CPC ... H04W 52/48; H04W 52/146; H04W 52/50; H04W 52/18; H04W 74/006; H04W 24/02; H04W 52/54; H04W 56/001; H04W 52/32; H04W 84/06
See application file for complete search history.

(56) References Cited

U.S. PATENT DOCUMENTS

| | | | | |
|---|---|---|---|---|
| 2018/0054251 | A1* | 2/2018 | Alex | H04B 7/18506 |
| 2018/0233055 | A1* | 8/2018 | Damnjanovic | G08G 5/57 |
| 2018/0288713 | A1* | 10/2018 | Kosseifi | H04W 52/283 |
| 2019/0044681 | A1 | 2/2019 | Zhang | |
| 2019/0364507 | A1* | 11/2019 | De Rosa | H04W 52/146 |
| 2020/0033849 | A1* | 1/2020 | Yiu | H04W 76/27 |
| 2020/0100187 | A1* | 3/2020 | Balasubramanian | H04B 17/345 |
| 2020/0128588 | A1 | 4/2020 | Xiong et al. | |
| 2020/0163026 | A1* | 5/2020 | Zhao | H04W 52/242 |
| 2020/0213956 | A1 | 7/2020 | Fridén et al. | |
| 2020/0220612 | A1* | 7/2020 | Thomas | H04B 7/18502 |
| 2020/0344699 | A1* | 10/2020 | Hu | H04W 52/362 |
| 2021/0021333 | A1* | 1/2021 | Kusashima | H04W 52/242 |
| 2021/0045067 | A1* | 2/2021 | Zhang | H04L 5/0023 |
| 2021/0051595 | A1* | 2/2021 | Rico Alvarino | H04W 52/283 |
| 2021/0068058 | A1* | 3/2021 | Sun | H04W 52/14 |
| 2021/0083822 | A1 | 3/2021 | Jia et al. | |
| 2021/0084598 | A1* | 3/2021 | Ökvist | G01C 5/00 |
| 2021/0136694 | A1* | 5/2021 | Gao | H04W 52/245 |
| 2021/0168725 | A1* | 6/2021 | Muruganathan | H04W 24/10 |
| 2021/0289445 | A1* | 9/2021 | Muruganathan | H04W 52/146 |
| 2021/0320713 | A1* | 10/2021 | Perlow | H04B 7/0617 |
| 2022/0078731 | A1* | 3/2022 | He | H04L 5/0048 |
| 2022/0183076 | A1* | 6/2022 | Lee | H04W 52/247 |
| 2022/0338128 | A1* | 10/2022 | Lee | H04W 52/283 |
| 2022/0394499 | A1* | 12/2022 | Matsumura | H04L 5/0051 |
| 2023/0007700 | A1* | 1/2023 | Saha | H04W 74/0841 |
| 2023/0011479 | A1* | 1/2023 | Saha | H04W 72/1268 |
| 2023/0121034 | A1* | 4/2023 | Liu | H04W 52/242 370/318 |
| 2024/0172201 | A1* | 5/2024 | Fujii | H04B 7/0408 |
| 2024/0179638 | A1* | 5/2024 | Jiang | H04W 52/325 |

FOREIGN PATENT DOCUMENTS

| | | | | |
|---|---|---|---|---|
| CN | 111542105 | A | 8/2020 | |
| EP | 3462646 | A1 * | 4/2019 | H04B 17/318 |
| EP | 3606270 | A1 * | 2/2020 | H04W 74/00 |
| EP | 3618511 | B1 | 4/2021 | |

OTHER PUBLICATIONS

Samsung. "Remaining Details on PRACH Procedure" 3GPP TSG RAN WG1 Meeting NR#3 RI-1715914, Sep. 21, 2017.
Extended European Search Report in Application No. 22841340.7, dated May 13, 2025, 10 pages.

* cited by examiner

POWER CONTROL METHOD AND APPARATUS, NETWORK NODE, TERMINAL AND STORAGE MEDIUM

CROSS REFERENCE TO RELATED APPLICATIONS

This application is a national stage application filed under 35 U.S.C. 371 based on International Patent Application No. PCT/CN2022/105046, filed on Jul. 12, 2022, which claims priority to Chinese Patent Application No. 202110784568.7 filed with the CNIPA on Jul. 12, 2021, disclosures of which are incorporated herein by reference in their entireties.

TECHNICAL FIELD

The present application relates to the technical field of wireless communication networks, for example, a power control method and apparatus, a network node, a terminal and a storage medium.

BACKGROUND

In the New Radio (NR) system, the terminal follows the standard full path loss compensation, that is, $\alpha=1$, which is specified in standards during the initial random access procedure. In the case where the terminal is a drone, the line of sight (LoS) wireless transmission channel is mainly used between the drone and both the network side serving base station and neighbor cells. If the full path loss compensation is used, transmission power of the drone will be high and interference is caused to neighbor cells. In addition, if the drone consistently adopts a single maximum power limit in different states, the maximum transmission power of the drone in the air flight mode will become relatively high and interference will be caused. The poor flexibility of power control further leads to significant link interference and power waste.

SUMMARY

The present application provides a power control method and apparatus, a network node, a terminal and a storage medium, so as to improve the flexibility of power control.

An embodiment of the present application provides a power control method. The power control method includes the following.

Configuration signaling is sent, where the configuration signaling is used for indicating L power control parameter sets associated with N synchronization signal block (SSB) sets, where N is a positive integer and L is a positive integer.

A random access preamble is received, where transmission power of the random access preamble is determined by a terminal according to the configuration signaling.

An embodiment of the present application further provides a power control method. The power control method includes the following.

Configuration signaling is received, where the configuration signaling is used for indicating L power control parameter sets associated with N SSB sets, where N is a positive integer and L is a positive integer.

Transmission power is determined according to a power configuration parameter.

An embodiment of the present application further provides a power control apparatus. The power control apparatus includes a signaling sending module and a receiving module.

The signaling sending module is configured to send configuration signaling, where the configuration signaling is used for indicating L power control parameter sets associated with N SSB sets, where N is a positive integer and L is a positive integer.

The receiving module is configured to receive a random access preamble, where transmission power of the random access preamble is determined by a terminal according to the configuration signaling.

An embodiment of the present application further provides a power control apparatus. The power control apparatus includes a signaling receiving module and a power control module.

The signaling receiving module is configured to receive configuration signaling, where the configuration signaling is used for indicating L power control parameter sets associated with N SSB sets, where N is a positive integer and L is a positive integer.

The power control module is configured to determine transmission power according to a power configuration parameter.

An embodiment of the present application further provides a network node. The network node includes a memory, a processor and a computer program stored in the memory and executable by the processor, where the processor, when executing the program, implements the preceding power control method.

An embodiment of the present application further provides a terminal. The terminal includes a memory, a processor and a computer program stored in the memory and executable by the processor, where the processor, when executing the program, implements the preceding power control method.

An embodiment of the present application further provides a computer-readable storage medium, which is configured to store a computer program, where the program, when executed by a processor, causes the processor to implement the preceding power control method.

DETAILED DESCRIPTION

Figure 1:
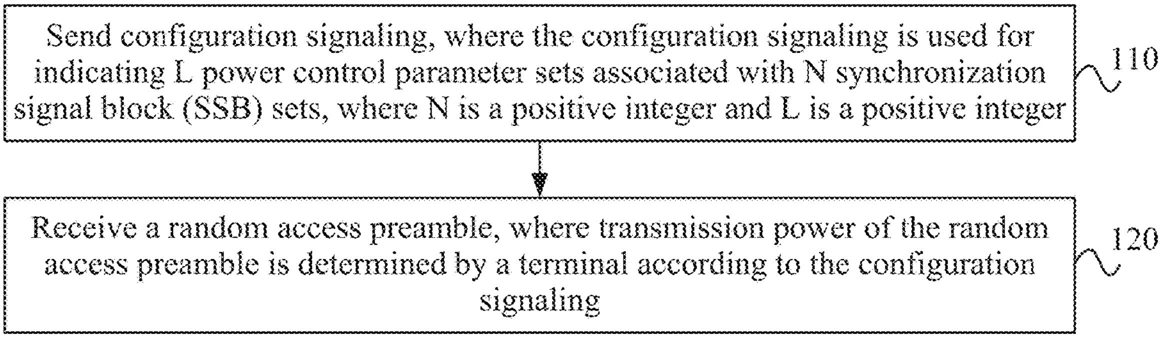
FIG. 1 is a flowchart of a power control method according to an embodiment.

The present application is described hereinafter in conjunction with the drawings and embodiments. It is to be understood that the embodiments described herein are intended to explain the present application and not to limit the present application. It is to be noted that if not in collision, embodiments of the present application and features therein may be combined with each other in any manner. Additionally, it is to be noted that for ease of description, only part, not all, of structures related to the present application are illustrated in the drawings.

In the new radio (NR) system, a terminal usually uses a single power control parameter. For a drone, although the power control parameter may be related to the flight altitude of the drone, it is still not possible to ensure moderate transmission power in each direction. The maximum transmission power of the drone in the air flight mode is relatively high, which can cause interference to neighbor cells, further leading to significant link interference and power waste.

In an embodiment of the present application, a power control method is provided. The method may be applied to a network node, such as a base station or an access point that provides service for a terminal. The terminal mainly refers to a flyable terminal such as a drone. Communication between the terminal and the network node is mainly achieved through line of sight (LoS) channels.

FIG. 1 is a flowchart of a power control method according to an embodiment. As shown in FIG. 1, the method provided in the embodiment includes 110 and 120.

In 110, configuration signaling is sent, where the configuration signaling is used for indicating L power control parameter sets associated with N synchronization signal block (SSB) sets, where N is a positive integer and L is a positive integer.

In 120, a random access preamble is received, where transmission power of the random access preamble is determined by a terminal according to the configuration signaling.

In the embodiment, an SSB set includes at least one SSB, a power control parameter set includes at least one power control parameter. Power control parameters and SSBs are associated and indicated to the terminal through the configuration signaling, so that when using different SSBs to access the network, the terminal can use a power control parameter associated with the SSB set to which the used SSB belongs to determine the transmission power of the random access preamble, thereby flexibly controlling the transmission power of the terminal in each direction. On this basis, the power control parameter sets are reasonably configured, so that the maximum transmission power of the terminal can be limited, thus link interference can be reduced, and power waste can be avoided.

In an embodiment, the power control parameter sets include at least one of following parameters: a partial path loss compensation factor associated with an SSB, physical random access channel (PRACH) target reception power associated with an SSB or a maximum power limit corresponding to a flying level associated with an SSB.

In the embodiment, a partial path loss compensation factor may be configured for each SSB set through the configuration signaling and is denoted as $\alpha_{b,f,c}$ which specifically represents a partial path loss compensation factor of the terminal for uplink subband b activated on carrier f of cell c. The value of $\alpha_{b,f,c}$ and an association relationship between $\alpha_{b,f,c}$ and the SSB set may be indicated by the network side.

PRACH target reception power may be configured for each SSB set through the configuration signaling and is denoted as $P_{PRACH,target,f,c}$. The value of $P_{PRACH,target,f,c}$ and an association relationship between $P_{PRACH,target,f,c}$ and the SSB set may be indicated by the network side. Moreover, $P_{PRACH,target,f,c}$ is related to four parameters, that is, preamble initial received target power, a preamble format, a preamble power ramping step and a maximum number of preamble retransmissions. Values of one or more of these four parameters and association relationships between the one or more of these four parameters and the SSB set may also be indicated by the network side.

The maximum power limit corresponding to the flying level may be configured for each SSB set through the configuration signaling and is denoted as $P_{CMAX,mode,f,c}(i)$ which specifically represents the maximum transmission power at transmission moment i for carrier f of cell c when the terminal is in a mode (including aground mode and an air mode). $P_{CMAX,mode,f,c}(i)$ is associated with the SSB set, and $P_{CMAX,mode,f,c}(i)$ may be configured according to the position of the terminal (the position of the terminal may be acquired from the terminal itself, such as through positioning by the Global Positioning System (GPS)) or according to different states of the altitude (whether the terminal is on the ground or in the air) of the terminal.

In an embodiment, the PRACH target reception power is associated with following parameters: the preamble initial received target power, the preamble format, the preamble power ramping step and the maximum number of preamble retransmissions. The power control parameter set further includes at least one of the preamble initial received target power, the preamble format, the preamble power ramping step or the maximum number of preamble retransmissions.

In the embodiment, $P_{CMAX,mode,f,c})$=preambleReceivedTargetPower+DELTA_PREAMBLE+(PREAMBLE_POWER_RAMPING_COUNTER−1)×PREAMBLE_POWER_RAMPING_STEP. preambleReceivedTargetPower represents the preamble initial received target power, DELTA_PREAMBLE represents the preamble format, PREAMBLE_POWER_RAMPING_STEP represents the preamble power ramping step, and PREAMBLE_POWER_RAMPING_COUNTER represents the maximum number of preamble retransmissions. The four parameters may be configured by a higher layer.

In an embodiment, the maximum power limit corresponding to the flying level is configured according to a power class associated with the SSB or a power offset associated with the SSB.

In the embodiment, $P_{CMAX,mode,f,c}(i)$ may be configured or adjusted in manners described below. 1) $P_{CMAX,mode,f,c}(i)$ is configured or adjusted according to the power class, that is, the network side indicates that the terminal determines the maximum power corresponding to the flying level according to different power classes, such as transmitting according to flying level PC2 (26 dB) on the ground, and transmitting according to flying level PC3 (23 dB) in the air (the altitude reaches a specific threshold); 2) $P_{CMAX,mode,f,c}(i)$ is configured or adjusted according to the power offset, that is, it is indicated that the power is adjusted by offset offset; for example, the maximum power limit corresponding to the adjusted flying level is denoted as $P_{CMAX,mode,f,c}'$, which satisfies that $P_{CMAX,mode,f,c}'=P_{CMAX,mode,f,c}+\text{offset}$.

In an embodiment, the transmission power of the terminal is the minimum value in a first parameter and a second parameter. The first parameter is the maximum power limit (that it, $P_{CMAX,mode,f,c}$) corresponding to the flying level. The second parameter is the sum of following two parameters: PRACH target reception power (that is, $P_{PRACH,target,f,c}$) associated with a target SSB and the product (that is, $\alpha_{b,f,c}\cdot PL_{b,f,c}$) of a partial path loss compensation factor associated with the target SSB and a downlink path loss estimation value.

In the embodiment, the transmission power of the terminal is determined according to the formula described below.

$P_{PRACH,b,f,c}(i)=\min(P_{CMAX,mode,f,c}(i)\quad P_{PRACH,target,f,c}+\alpha_{b,f,c}\cdot PL_{b,f,c})$. $PL_{b,f,c}$ is an estimation of the downlink path loss of uplink subband b activated on carrier f of cell c. $P_{CMAX,mode,f,c}$ and $\alpha_{b,f,c}$ may be acquired through broadcasting system information such as a system information block (SIB) or a master information block (MIB) by the network.

In an embodiment, the configuration signaling is broadcasted and sent through the SIB or the MIB.

In the Long Term Evolution (LTE) system, only non-beamforming omnidirectional transmission can be used; for Massive Multiple In Multiple Out (MIMO) in the NR, the embodiment provides beamforming directional transmission in both the vertical dimension and the horizontal dimension, so that the coverage is further improved, and on this basis, the interference of the transmission power of the transmitting terminal to other neighbor cells can be effectively reduced and energy waste is avoided effectively.

Figure 2:
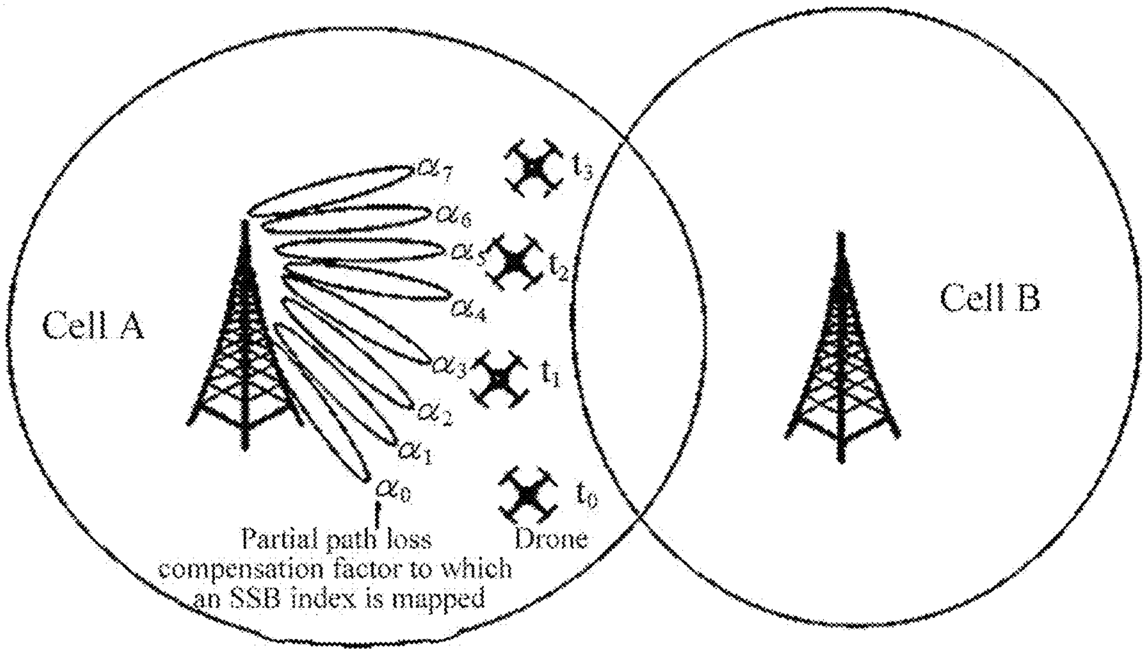
FIG. 2 is a schematic diagram of transmission power control for camping in a source cell according to an embodiment.

FIG. 2 is a schematic diagram of transmission power control for camping in a source cell according to an embodiment. The scene where a drone camps in a source cell after starting up is taken as an example in the embodiment for describing the transmission power control process. As shown in FIG. 2, the network side broadcasts the partial path loss compensation factor associated with each SSB and the maximum transmission power through the system information SIB or MIB. For example, the association relationship configured by the network side includes: {SSB0, SSB1, . . . , SSB7}—>{α0, α1 . . . , α7}. It is assumed that SSB0 and SSB1 are mapped to the maximum transmission power $P_{CMAX,0,f,c}(i)$, and SSB2 to SSB7 are mapped to the maximum transmission power $P_{CMAX,1,f,c}(i)$ of the drone in the air mode.

The drone starts up at moment t0 and performs initial random access on the optimal beam, to which SSB1 of cell A is mapped, after beam polling.

The drone acquires the partial path loss compensation factor al associated with SSB1 and the maximum transmission power $P_{CMAX,0,f,c}(t\mathbf{0})$ which are broadcasted by the network side and receives the broadcasted PRACH target reception power $P_{PRACH,target,f,c}$, and estimates the downlink path loss according to SSB1.

On this basis, the drone determines PRACH transmission power satisfying that $$P_{PRACH,b,f,c}(t0)=\min(P_{CMAX,0,f,c}(t0),\ P_{PRACH,target,f,c}+\alpha_1\cdot PL_{b,f,c}).$$

The PRACH transmission power of the drone during the ascending flying process at moments t1, t2, and t3 is determined based on a similar process.

Figure 3:
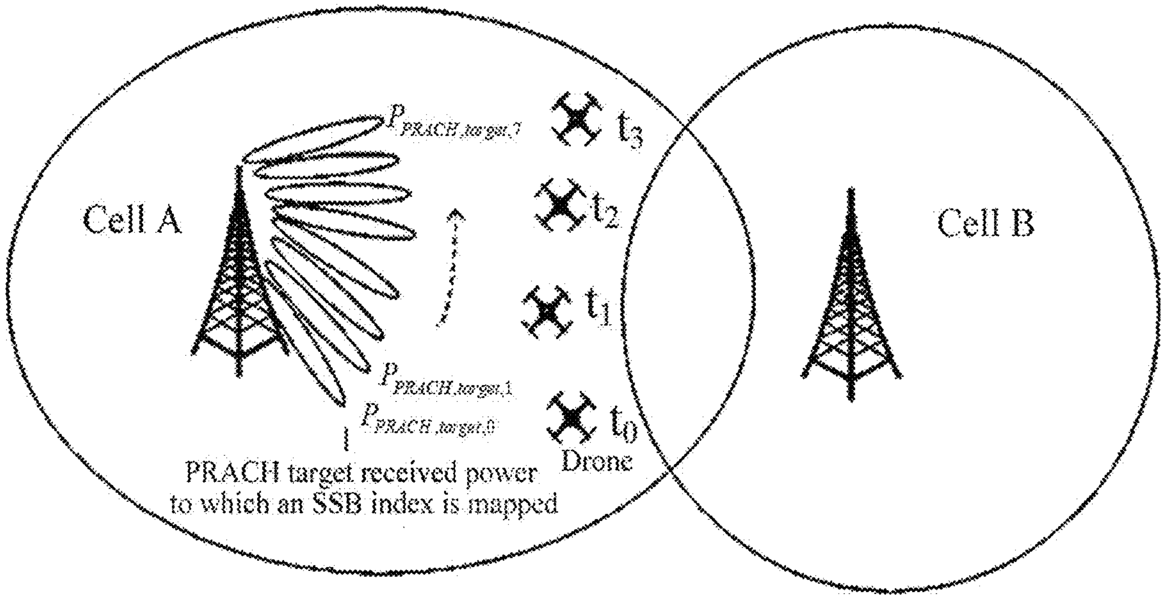
FIG. 3 is another schematic diagram of transmission power control for camping in a source cell according to an embodiment.

FIG. 3 is another schematic diagram of transmission power control for camping in a source cell according to an embodiment. The scene where a drone camps in a source cell after starting up is taken as an example in the embodiment for describing the transmission power control process. As shown in FIG. 3, the network side broadcasts the PRACH target reception power associated with each SSB and the maximum transmitting power through the system information SIB or MIB. For example, the association relationship configured by the network side includes: {SSB0, SSB1, . . . , SSB7}→{$P_{PRACH,target,0}$, $P_{RPACH,target,1}$, . . . , $P_{PRACH,target,7}$}. $P_{PRACH,target,f,c}$ includes four parameters, that is, the preamble initial received target power, the preamble format, the preamble power ramping step and the maximum number of preamble retransmissions, and the association relationship between at least one parameter associated with $P_{PRACH,target,f,c}$ and the SSB is configured. It is assumed that SSB0 and SSB1 are mapped to the maximum transmission power $P_{CMAX,0,f,c}(i)$ of the drone in the ground mode, and SSB2 to SSB7 are mapped to the maximum transmission power $P_{CMAX,1,f,c}(i)$ of the drone in the air mode.

The drone starts up at moment t0 and performs initial random access on the optimal beam, to which the SSB1 of cell A is mapped, after beam polling.

The drone acquires the PRACH target reception power $P_{PRACH,target,1}$ and the maximum transmission power $P_{CMAX,0,f,c}(i)$, to which SSB1 is mapped, broadcasted by the network side, and estimates the downlink path loss according to SSB1. If a partial path loss compensation factor is not received, the full path loss compensation is used, that is, $\alpha_{b,f,c}=1$.

On this basis, the drone determines PRACH transmission power satisfying that $$P_{PRACH,b,f,c}(i)=\min(P_{CMAX,mode,f,c}(i),\ P_{PRACH,target,f,c}+\alpha_0\cdot PL_{b,f,c}).$$

The PRACH transmission power of the drone during the ascending flying process at moments t1, t2, and t3 is determined based on a similar process.

Figure 4:
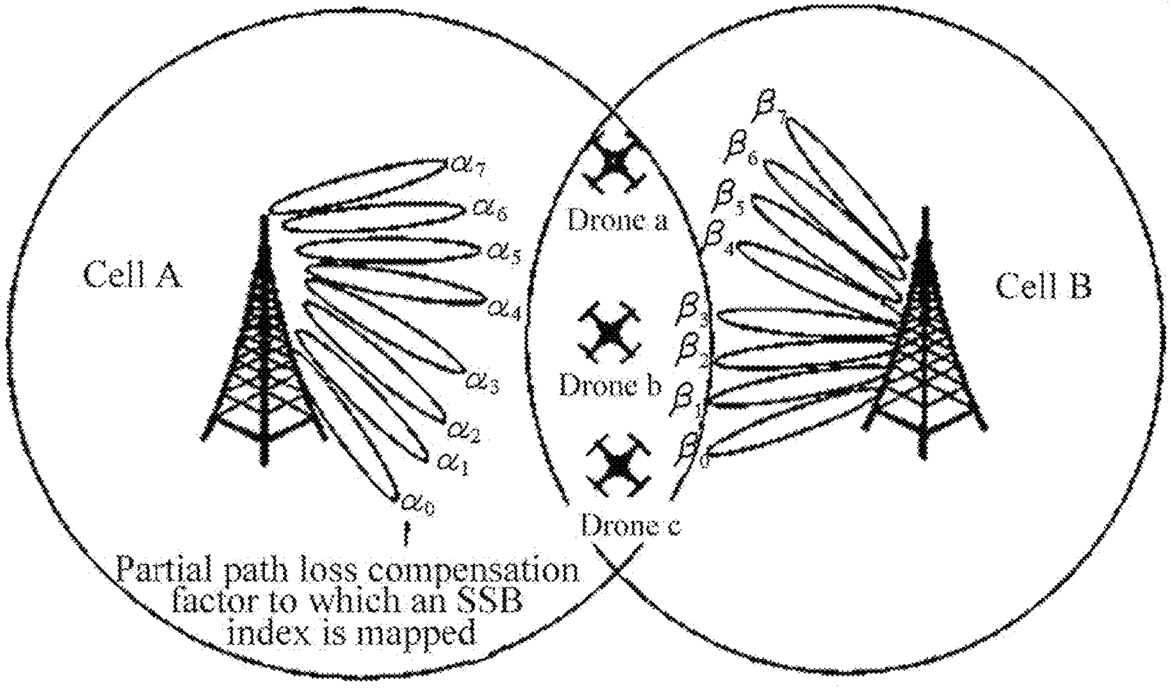
FIG. 4 is a schematic diagram of transmission power control for cell switching according to an embodiment.

FIG. 4 is a schematic diagram of transmission power control for cell switching according to an embodiment. The scene where the drone switches to a target cell (switches from cell A to cell B) after starting up is taken as an example in the embodiment for describing the transmission power control process. As shown in FIG. 4, the network side broadcasts the partial path loss compensation factor to which the SSB of each cell is mapped or the PRACH target reception power $P_{RACH,target,f,c}$ to which each SSB is mapped and the value of a maximum transmission power set through the system information SIB or MIB. For example, the association relationship configured by the network side includes: {SSB0, SSB1, . . . , SSB7}→{α0, α1, . . . , α7} in cell A and {SSB0, SSB1, . . . , SSB7}→{β0, β1, . . . , β7} in cell B. Without loss of generality, it is assumed that both SSB0 and SSB1 of cell A and SSB0 and SSB1 of cell B are mapped to the maximum transmission power $P_{CMAX,0,f,c}(i)$ of the drone in the ground mode; without losing generality, it is assumed that both SSB2 to SSB7 of cell A and SSB2 to SSB7 of cell B are mapped to the maximum transmission power $P_{CMAX,1,f,c}(i)$ of the drone in the air mode.

Drone a switches in the process of flying from cell A to cell B, and selects cell B after measuring the SSB and performs initial random access on the optimal beam to which SSB5 is mapped.

Drone a acquires partial path loss compensation factor β5, to which SSB5 is mapped, and the maximum transmission power $P_{CMAx,1,f,c}(i)$ which are broadcasted by the network side and receives the broadcasted PRACH target reception power $P_{PRACH,target,1}$, and estimates the downlink path loss according to SSB5.

On this basis, the drone determines PRACH transmission power satisfying that $$P_{PRACH,b,f,c}(t0)=\min(P_{CMAX,1,f,c}(t0),\ P_{PRACH,target,1}+\beta_5\cdot PL_{b,f,c}).$$

During the process of cell switching, the PRACH transmission power at moment i of drone b and drone c is determined based on a similar process.

In an embodiment of the present application, a power control method is further provided. The method may be applied to a terminal, which mainly refer to a flyable terminal such as a drone. Communication between the terminal and the network node is mainly achieved through the LoS channel. It is to be noted that for technical details not fully described in the embodiment, reference may be made to any of the preceding embodiments.

Figure 5:
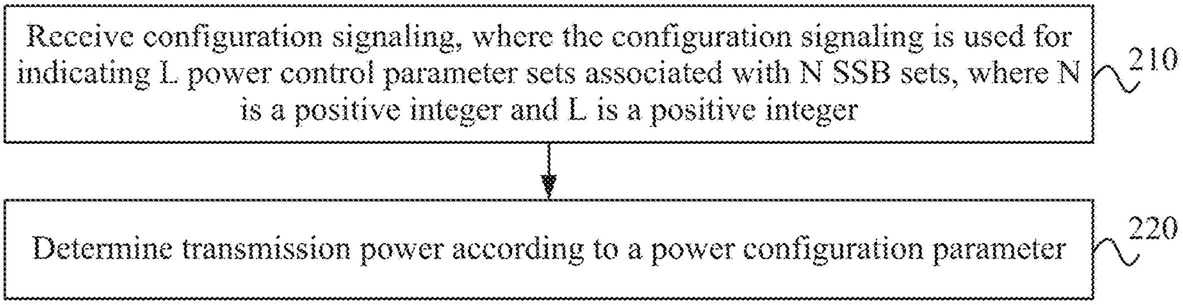
FIG. 5 is a flowchart of another power control method according to an embodiment.

FIG. 5 is a flowchart of another power control method according to an embodiment. As shown in FIG. 5, the method provided in the embodiment includes 210 and 220.

In 210, configuration signaling is received, where the configuration signaling is used for indicating L power control parameter sets associated with N SSB sets, where N is a positive integer and L is a positive integer.

In 220, transmission power is determined according to a power configuration parameter.

In the embodiment, an SSB set includes at least one SSB, and a power control parameter set includes at least one power control parameter. Power control parameters and SSBs are associated and indicated to a terminal through the configuration signaling, so that when different SSBs are used for accessing the network, the transmission power may be determined by using corresponding power control parameters, and thus the transmission power of the terminal in each direction can be flexibly controlled. On this basis, the power control parameter sets are reasonably configured, so that the maximum transmission power of the terminal can be limited, thus link interference can be reduced, and power waste can be avoided.

In an embodiment, the power control parameter includes at least one of following parameters: a partial path loss compensation factor associated with an SSB, PRACH target reception power associated with an SSB or a maximum power limit corresponding to a flying level associated with an SSB.

In an embodiment, the PRACH target reception power is associated with following parameters: preamble initial received target power, a preamble format, a preamble power ramping step and a maximum number of preamble retransmissions.

The power control parameter sets further include at least one of the preamble initial received target power, the preamble format, the preamble power ramping step or the maximum number of preamble retransmissions.

In an embodiment, the maximum power limit corresponding to the flying level is configured according to a power class associated with the SSB or a power offset associated with the SSB.

In an embodiment, 220 includes 2210 and 2220.

In 2210, a target SSB is selected through beam polling or a target SSB is determined through signaling switching, and a network is accessed through a beam to which the target SSB is mapped.

In 2220, the transmission power is determined according to a power control parameter associated with the target SSB.

In an embodiment, the transmission power is the minimum value of a first parameter and a second parameter. The first parameter is the maximum power limit corresponding to the flying level; and the second parameter is the sum of following two parameters: PRACH target reception power associated with a target SSB and the product of a partial path loss compensation factor associated with the target SSB and a downlink path loss estimation value.

In an embodiment, the configuration signaling is broadcasted and received through an SIB or an MIB.

Figure 6:
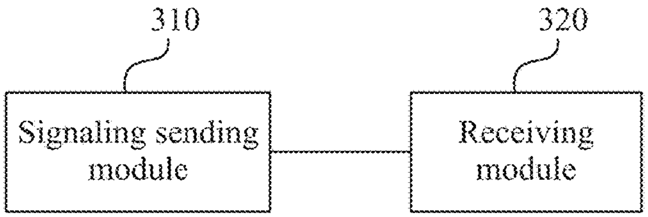
FIG. 6 is a structural diagram of a power control apparatus according to an embodiment.

An embodiment of the present application further provides a power control apparatus. FIG. 6 is a structural diagram of a power control apparatus according to an embodiment. As shown in FIG. 6, the apparatus includes a signaling sending module 310 and a receiving module 320.

The signaling sending module 310 is configured to send configuration signaling, where the configuration signaling is used for indicating L power control parameter sets associated with N SSB sets, where N is a positive integer and L is a positive integer.

The receiving module 320 is configured to receive a random access preamble, where transmission power of the random access preamble is determined by a terminal according to the configuration signaling.

According to the power control apparatus in the embodiment, power control parameters and SSBs are associated and indicated to the terminal through the configuration signaling, so that when using different SSBs to access the network, the terminal can use a corresponding power control parameter to determine the transmission power, thereby flexibly controlling the transmission power of the terminal in each direction On this basis, the power control parameter sets are reasonably configured, so that the maximum transmission power of the terminal can be limited, thus link interference can be reduced, and power waste can be avoided.

In an embodiment, the power control parameter sets include at least one of following parameters: a partial path loss compensation factor associated with an SSB, PRACH target reception power associated with an SSB or a maximum power limit corresponding to a flying level associated with an SSB.

In an embodiment, the PRACH target reception power is associated with following parameters: preamble initial received target power, a preamble format, a preamble power ramping step and a maximum number of preamble retransmissions.

The power control parameter sets further include at least one of the preamble initial received target power, the preamble format, the preamble power ramping step or the maximum number of preamble retransmissions.

In an embodiment, the maximum power limit corresponding to the flying level is configured according to a power class associated with the SSB or a power offset associated with the SSB.

In an embodiment, the transmission power of the terminal is the minimum value of a first parameter and a second parameter.

The first parameter is the maximum power limit corresponding to the flying level.

The second parameter is the sum of following two parameters: PRACH target reception power associated with a target SSB and the product of a partial path loss compensation factor associated with the target SSB and a downlink path loss estimation value.

In an embodiment, the configuration signaling is broadcasted and sent through an SIB or an MIB.

The power control apparatus provided in the embodiment and the power control method provided in the preceding embodiment belong to the same inventive concept. For technical details not described in detail in the embodiment, reference may be made to any one of the preceding embodiments, and the embodiment has the same beneficial effects as executing the power control method.

Figure 7:
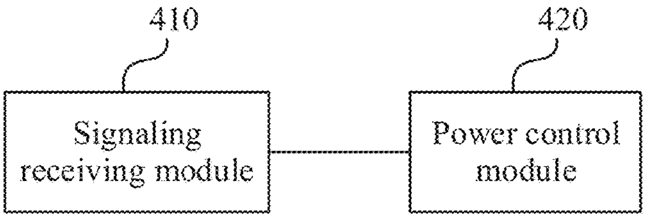
FIG. 7 is a structural diagram of another power control apparatus according to an embodiment.

An embodiment of the present application further provides a power control apparatus. FIG. 7 is a structural diagram of another power control apparatus according to an embodiment. As shown in FIG. 7, the power control apparatus includes a signaling receiving module 410 and a power control module 420.

The signaling receiving module 410 is configured to receive configuration signaling, where the configuration signaling is used for indicating L power control parameter sets associated with N SSB sets, where N is a positive integer and L is a positive integer.

The power control module 420 is configured to determine transmission power according to a power configuration parameter.

According to the power control apparatus in the embodiment, an SSB set includes at least one SSB, and a power control parameter set includes at least one power control parameter. Power control parameters and SSBs are associated and indicated to a terminal through the configuration signaling, so that when different SSBs are used for accessing the network, the transmission power may be determined by using a corresponding power control parameter, and thus the transmission power of the terminal in each direction can be flexibly controlled. On this basis, the power control parameter sets are reasonably configured, so that the maximum transmission power of the terminal can be limited, thus link interference can be reduced, and power waste can be avoided.

In an embodiment, the power control parameter includes at least one of following parameters: a partial path loss compensation factor associated with an SSB, PRACH target reception power associated with an SSB or a maximum power limit corresponding to a flying level associated with an SSB.

In an embodiment, the PRACH target reception power is associated with following parameters: preamble initial received target power, a preamble format, a preamble power ramping step and a maximum number of preamble retransmissions.

The power control parameter sets further include at least one of the preamble initial received target power, the preamble format, the preamble power ramping step or the maximum number of preamble retransmissions.

In an embodiment, the maximum power limit corresponding to the flying level is configured according to a power class associated with the SSB or a power offset associated with the SSB.

In an embodiment, the power control module 420 includes a beam selection unit and a power determination unit.

The beam selection unit is configured to select a target SSB through beam polling or determine a target SSB through signaling switching, and a network is accessed through a beam to which the target SSB is mapped.

The power determination unit is configured to determine the transmission power according to a power control parameter associated with the target SSB.

In an embodiment, the transmission power is the minimum value of a first parameter and a second parameter.

The first parameter is the maximum power limit corresponding to the flying level.

The second parameter is the sum of following two parameters: PRACH target reception power associated with a target SSB and the product of a partial path loss compensation factor associated with the target SSB and a downlink path loss estimation value.

In an embodiment, the configuration signaling is broadcasted and received through an SIB or an MIB.

The power control apparatus provided in the embodiment and the power control method provided in the preceding embodiment belong to the same inventive concept. For technical details not described in detail in the embodiment, reference may be made to any one of the preceding embodiments, and the embodiment has the same beneficial effects as executing the power control method.

Figure 8:
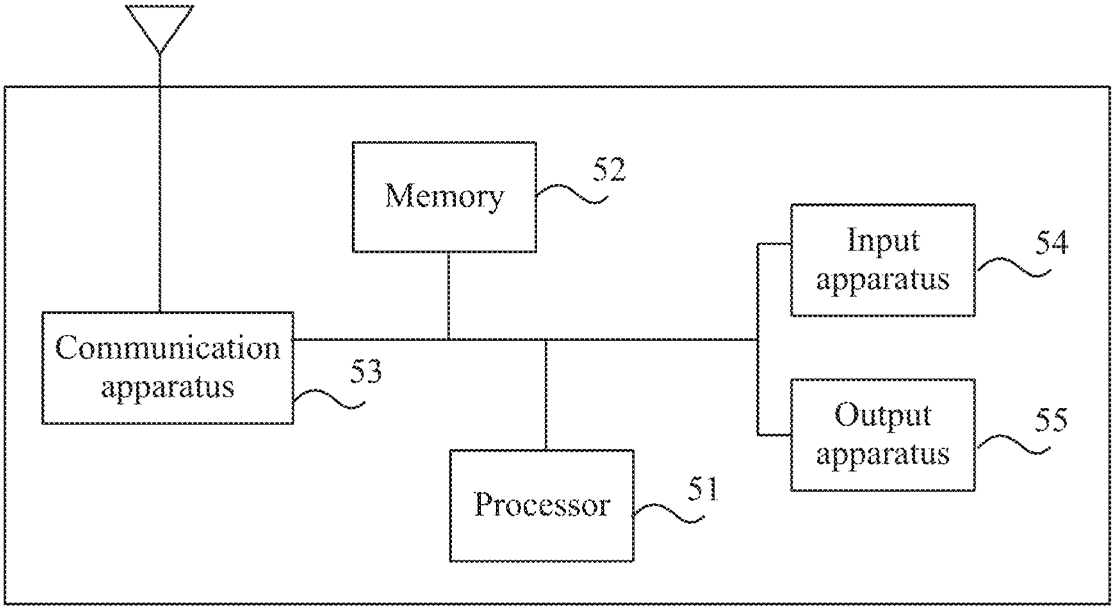
FIG. 8 is a structural diagram of hardware of a network node according to an embodiment.

An embodiment of the present application further provides a network node. FIG. 8 is a structural diagram of hardware of a network node according to an embodiment. As shown in FIG. 8, the network node provided in the present application includes a memory 52, a processor 51 and a computer program stored in the memory and executable by the processor, where the processor 51, when executing the program, implements the preceding power control method.

The network node may further include the memory 52; one or more processors 51 may be provided in the network node, and one processor 51 is used as an example in FIG. 8; the memory 52 is configured to store one or more programs; when executed by the one or more processors 51, the one or more programs cause the one or more processors 51 to implement the power control method in the embodiment of the present application.

The network node further includes a communication apparatus 53, an input apparatus 54 and an output apparatus 55.

The processor 51, the memory 52, the communication apparatus 53, the input apparatus 54 and the output apparatus 55 in the network node may be connected through a bus or in other manners, and the connection through the bus is used as an example in FIG. 8.

The input apparatus 54 is configured to receive input digital or character information and generate key signal input related to user settings and function control of the network node. The output apparatus 55 may include a display device such as a display screen.

The communication apparatus 53 may include a receiver and a sender. The communication apparatus 53 is configured to perform information transceiving communication under the control of the processor 51.

As a computer-readable storage medium, the memory 52 may be configured to store software programs and computer-executable programs and modules such as program instructions/modules (for example, the signaling sending module 310 and the receiving module 320 in the power control apparatus) corresponding to the power control method described in the embodiment of the present application. The memory 52 may include a program storage region and a data storage region, where the program storage region may store an operating system and an application program required by at least one function, and the data storage region may store data or the like created according to the use of the network node. Additionally, the memory 52 may include a high-speed random-access memory and may also include a nonvolatile memory, such as at least one magnetic disk memory, a flash memory or another nonvolatile solid-state memory. In some examples, the memory 52 may include memories which are remotely disposed relative to the processor 51, and these remote memories may be connected to the network node via a network. Examples of the preceding network include, but are not limited to, the Internet, an intranet, a local area network, a mobile communication network and a combination thereof.

Figure 9:
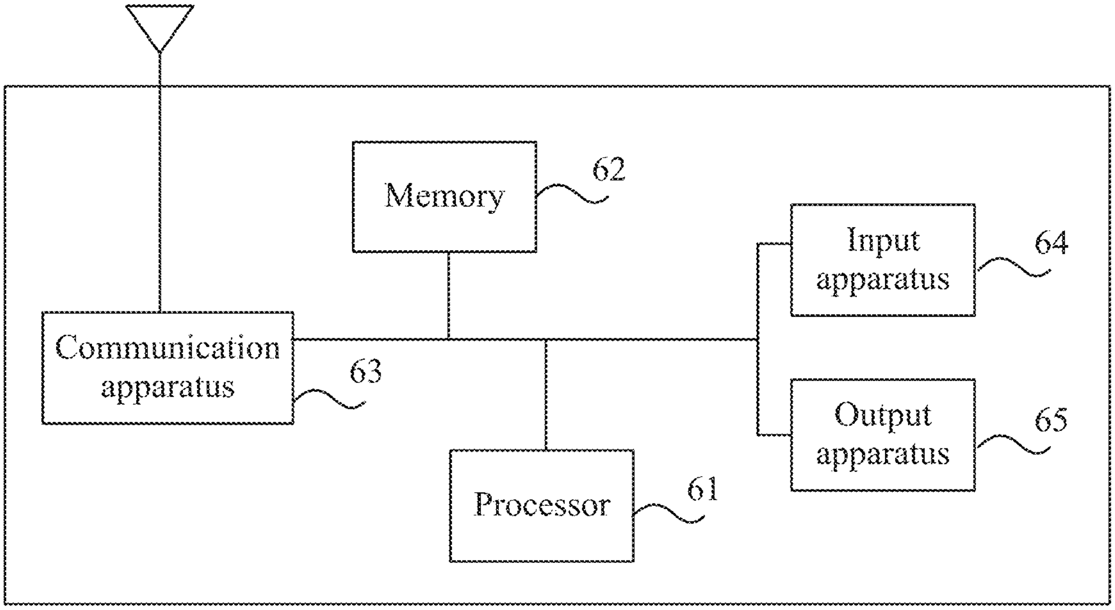
FIG. 9 is a structural diagram of hardware of a terminal according to an embodiment.

An embodiment of the present application further provides a terminal. FIG. 9 is a structural diagram of hardware of a terminal according to an embodiment. As shown in FIG. 9, the terminal provided in the present application includes a memory 62, a processor 61 and a computer program stored in the memory and executable by the processor, where the processor 61, when executing the program, implements the preceding power control method.

The terminal may further include the memory 62; one or more processors 61 may be provided in the terminal, and one processor 61 is used as an example in FIG. 9; the memory 62 is configured to store one or more programs; when executed by the one or more processors 61, the one or more programs cause the one or more processors 61 to implement the power control method in the embodiment of the present application.

The terminal further includes a communication apparatus 63, an input apparatus 64 and an output apparatus 65.

The processor 61, the memory 62, the communication apparatus 63, the input apparatus 64 and the output apparatus 65 in the terminal may be connected through a bus or in other manners, and the connection through the bus is used as an example in FIG. 9.

The input apparatus 64 is configured to receive input digital or character information and generate key signal input related to user settings and function control of the terminal. The output apparatus 65 may include a display device such as a display screen.

The communication apparatus 63 may include a receiver and a sender. The communication apparatus 63 is configured to perform information transceiving communication under the control of the processor 61.

As a computer-readable storage medium, the memory 62 may be configured to store software programs and computer-executable programs and modules such as program instructions/modules (for example, the signaling receiving module 410 and the power control module 420 in the power control apparatus) corresponding to the power control method described in the embodiment of the present application. The memory 62 may include a program storage region and a data storage region. The program storage region may store an operating system and an application program required by at least one function, and the data storage region may store data created depending on the use of the terminal. Additionally, the memory 62 may include a high-speed random-access memory and may also include a nonvolatile memory, such as at least one magnetic disk memory, a flash memory or another nonvolatile solid-state memory. In some examples, the memory 62 may include memories which are remotely disposed relative to the processor 61, and these remote memories may be connected to the terminal via a network. Examples of the preceding network include, but are not limited to, the Internet, an intranet, a local area network, a mobile communication network and a combination thereof.

An embodiment of the present application further provides a storage medium. The storage medium stores a computer program which, when executed by a processor, causes the processor to implement the power control method according to any embodiment of the present application. The method includes the following: sending configuration signaling, where the configuration signaling is used for indicating L power control parameter sets associated with N SSB sets, where N is a positive integer and L is a positive integer; and receiving a random access preamble, where transmission power of the random access preamble is determined by a terminal according to the configuration signaling. Alternatively, the method includes the following: receiving configuration signaling, where the configuration signaling is used for indicating L power control parameter sets associated with N SSB sets, where N is a positive integer and L is a positive integer; and determining transmission power according to a power configuration parameter.

A computer storage medium in an embodiment of the present application may adopt any combination of one or more computer-readable media. The computer-readable media may be computer-readable signal media or computer-readable storage media. For example, a computer-readable storage medium may be, but is not limited to, an electrical, magnetic, optical, electromagnetic, infrared or semiconductor system, apparatus or device or any combination thereof. More specific examples of the computer-readable storage medium include (non-exhaustive list): an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc ROM (CD-ROM), an optical memory, a magnetic memory or any suitable combination thereof. The computer-readable storage medium may be any tangible medium including or storing a program. The program may be used by or used in conjunction with an instruction execution system, apparatus or device.

A computer-readable signal medium may include a data signal propagated in a baseband or as part of a carrier. The data signal carries computer-readable program codes. The data signal propagated in this manner may be in multiple forms including, but not limited to, an electromagnetic signal, an optical signal or any suitable combination thereof. The computer-readable signal medium may also be any computer-readable medium other than the computer-readable storage medium. The computer-readable medium may send, propagate or transmit a program used by or used in conjunction with an instruction execution system, apparatus or device.

The program codes included in the computer-readable medium may be transmitted in any suitable medium including, but not limited to, a wireless medium, a wire, an optical cable, a radio frequency (RF) or any suitable combination thereof.

Computer program codes for performing the operations of the present application may be written in one or more programming languages or a combination of multiple programming languages. The programming languages include object-oriented programming languages such as Java, Smalltalk, and C++ and may further include conventional procedural programming languages such as "C" or similar programming languages. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer through any type of network including a local area network (LAN) or a wide area network (WAN), or may be connected to an external computer (for example, via the Internet provided by an Internet service provider).

The preceding are only example embodiments of the present application and are not intended to limit the scope of the present application.

It is to be understood by those skilled in the art that the term user terminal encompasses any suitable type of wireless user device, for example, a mobile phone, a portable data processing apparatus, a portable web browser or a vehicle-mounted mobile station.

Generally speaking, embodiments of the present application may be implemented in hardware or special-purpose circuits, software, logic, or any combination thereof. For example, some aspects may be implemented in hardware while other aspects may be implemented in firmware or software executable by a controller, a microprocessor or another computing apparatus, though the present application is not limited thereto.

Embodiments of the present application may be implemented through the execution of computer program instructions by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps and logic circuits, modules and functions. Computer programs may be stored on a memory. The memory may be of any type suitable for a local technical environment and may be implemented using any suitable data storage technology, such as, but not limited to, a read-only memory (ROM), a random-access memory (RAM) and an optical memory device and system (a digital video disc (DVD) or a compact disc (CD)). Computer-readable media may include non-transitory storage media. The data processor may be of any type suitable for a local technical environment, for example, but not limited to, a general-purpose computer, a special-purpose computer, a microprocessor, a digital signal processor (DSP), an application-specific integrated circuit (ASIC), a field-programmable gate array (FGPA) and a processor based on a multi-core processor architecture.

What is claimed is:

1. A power control method, comprising:

sending configuration signaling, wherein the configuration signaling is used for indicating L power control parameter sets associated with N synchronization signal block (SSB) sets, wherein N is a positive integer and L is a positive integer; and receiving a random access preamble, wherein transmission power of the random access preamble is determined by a terminal according to the configuration signaling;

wherein the L power control parameter sets comprise at least one of following parameters: a partial path loss compensation factor associated with an SSB of the N SSB sets, physical random access channel (PRACH) target reception power associated with an SSB of the N SSB sets, or a maximum power limit corresponding to a flying level associated with an SSB of the N SSB sets; and wherein in a case where the L power control parameter sets comprise the maximum power limit corresponding to the flying level associated with the SSB of the N SSB sets, the maximum power limit corresponding to the flying level is configured according to a power class associated with the SSB or a power offset associated with the SSB.

2. The method according to claim 1, wherein the PRACH target reception power is associated with following parameters: preamble initial received target power, a preamble format, a preamble power ramping step and a maximum number of preamble retransmissions; and the L power control parameter sets further comprise at least one of the preamble initial received target power, the preamble format, the preamble power ramping step or the maximum number of preamble retransmissions.

3. The method according to claim 1, wherein in a case where the L power control parameter sets comprise the partial path loss compensation factor associated with the SSB of the N SSB sets, the physical random access channel (PRACH) target reception power associated with the SSB of the N SSB sets, and the maximum power limit corresponding to the flying level associated with the SSB of the N SSB sets, and the SSB comprises a target SSB, the transmission power of the terminal is a minimum value of a first parameter and a second parameter, wherein the first parameter is the maximum power limit corresponding to the flying level; and the second parameter is a sum of following two parameters: PRACH target reception power associated with the target SSB and a product of a partial path loss compensation factor associated with the target SSB and a downlink path loss estimation value.

4. The method according to claim 1, wherein the configuration signaling is broadcasted and sent through a system information block (SIB) or a master information block (MIB).

5. A power control method, comprising:

receiving configuration signaling, wherein the configuration signaling is used for indicating L power control parameter sets associated with N synchronization signal block (SSB) sets, wherein N is a positive integer and L is a positive integer; and determining transmission power according to a power control parameter in the L power control parameter sets;

wherein the L power control parameter sets comprise at least one of following parameters: a partial path loss compensation factor associated with an SSB of the N SSB sets, physical random access channel (PRACH) target reception power associated with an SSB of the N SSB sets, or a maximum power limit corresponding to a flying level associated with an SSB of the N SSB sets; and wherein in a case where the L power control parameter sets comprise the maximum power limit corresponding to the flying level associated with the SSB of the N SSB sets, the maximum power limit corresponding to the flying level is configured according to a power class associated with the SSB or a power offset associated with the SSB.

6. The method according to claim 5, wherein the PRACH target reception power is associated with following parameters: preamble initial received target power, a preamble format, a preamble power ramping step and a maximum number of preamble retransmissions; and the L power control parameter sets further comprise at least one of the preamble initial received target power, the preamble format, the preamble power ramping step or the maximum number of preamble retransmissions.

7. The method according to claim 5, wherein determining the transmission power according to the power control parameter comprises:

selecting a target SSB through beam polling or determining a target SSB through signaling switching, and accessing a network through a beam to which the target SSB is mapped; and determining the transmission power according to a power control parameter associated with the target SSB.

8. The method according to claim 7, wherein in a case where the L power control parameter sets comprise the partial path loss compensation factor associated with the SSB of the N SSB sets, the physical random access channel (PRACH) target reception power associated with the SSB of the N SSB sets, and the maximum power limit corresponding to the flying level associated with the SSB of the N SSB sets, and the SSB comprises the target SSB, the transmission power is a minimum value of a first parameter and a second parameter, wherein the first parameter is the maximum power limit corresponding to the flying level; and the second parameter is a sum of following two parameters: PRACH target reception power associated with the target SSB and a product of a partial path loss compensation factor associated with the target SSB and a downlink path loss estimation value.

9. The method according to claim 5, wherein the configuration signaling is broadcasted and received through a system information block (SIB) or a master information block (MIB).

10. A network node, comprising a memory, a processor and a computer program stored in the memory and executable by the processor, wherein the processor, when executing the computer program, implements the following steps:

sending configuration signaling, wherein the configuration signaling is used for indicating L power control parameter sets associated with N synchronization signal block (SSB) sets, wherein N is a positive integer and L is a positive integer; and receiving a random access preamble, wherein transmission power of the random access preamble is determined by a terminal according to the configuration signaling;

wherein the L power control parameter sets comprise at least one of following parameters: a partial path loss compensation factor associated with an SSB of the N SSB sets, physical random access channel (PRACH) target reception power associated with an SSB of the N SSB sets, or a maximum power limit corresponding to a flying level associated with an SSB of the N SSB sets; and wherein in a case where the L power control parameter sets comprise the maximum power limit corresponding to the flying level associated with the SSB of the N SSB sets, the maximum power limit corresponding to the flying level is configured according to a power class associated with the SSB or a power offset associated with the SSB.

11. A terminal, comprising a memory, a processor and a computer program stored in the memory and executable by the processor, wherein the processor, when executing the computer program, implements the power control method according to claim 5.

12. A non-transitory computer-readable storage medium, which is configured to store a computer program, wherein the computer program, when executed by a processor, causes the processor to implement the power control method according to claim 1.

13. A non-transitory computer-readable storage medium, which is configured to store a computer program, wherein the computer program, when executed by a processor, causes the processor to implement the power control method according to claim 5.

14. The network node according to claim 10, wherein the PRACH target reception power is associated with following parameters: preamble initial received target power, a preamble format, a preamble power ramping step and a maximum number of preamble retransmissions; and the L power control parameter sets further comprise at least one of the preamble initial received target power, the preamble format, the preamble power ramping step or the maximum number of preamble retransmissions.

* * * * *